US010550777B2

(12) United States Patent
Yager

(10) Patent No.: US 10,550,777 B2
(45) Date of Patent: Feb. 4, 2020

(54) METHOD AND SYSTEM FOR MATCHING AIR FLOW IN AN EXHAUST GAS RECIRCULATION SYSTEM

(75) Inventor: James Henry Yager, Lawrence Park, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 815 days.

(21) Appl. No.: 13/548,794

(22) Filed: Jul. 13, 2012

(65) Prior Publication Data

US 2014/0014075 A1    Jan. 16, 2014

(51) Int. Cl.
F02D 41/00    (2006.01)

(52) U.S. Cl.
CPC .................. F02D 41/0047 (2013.01)

(58) Field of Classification Search
CPC ....... Y02T 10/18; Y02T 10/47; Y02T 10/121; F02D 13/0207; F02D 13/0257; F02D 2041/001; F02D 41/0007; F02D 13/0219; F02D 13/0249; F02D 13/0242; F02D 13/0246; F02D 13/0261; F02M 25/07; F02M 25/0707; F02M 25/077; F02M 25/0704; F02M 25/0709
USPC ....... 123/568.11–568.32; 60/278, 602, 605.2
See application file for complete search history.

(56) References Cited

U.S. PATENT DOCUMENTS

| 4,364,345 | A | * | 12/1982 | Tsutsumi | ................. | F02D 17/02 |
| | | | | | | 123/198 F |
| 5,894,726 | A | | 4/1999 | Monnier | | |
| 6,286,489 | B1 | * | 9/2001 | Bailey | ................. | F02D 41/0047 |
| | | | | | | 123/568.11 |
| 6,827,067 | B1 | | 12/2004 | Yang et al. | | |
| 6,877,492 | B1 | * | 4/2005 | Osterwald | ........... | F02B 29/0437 |
| | | | | | | 123/568.11 |
| 2005/0022755 | A1 | | 2/2005 | Hitomi et al. | | |
| 2006/0070605 | A1 | | 4/2006 | Akihisa et al. | | |
| 2007/0175215 | A1 | * | 8/2007 | Rowells | ............. | F02B 29/0418 |
| | | | | | | 60/605.2 |

(Continued)

FOREIGN PATENT DOCUMENTS

| CN | 1695004 A | 11/2005 |
| CN | 101617111 A | 12/2009 |

(Continued)

OTHER PUBLICATIONS

International Search Report and Written Opinion issued in connection with corresponding PCT Application No. PCT/US2013/046562 dated Oct. 31, 2013.

(Continued)

*Primary Examiner* — Sizo B Vilakazi
(74) *Attorney, Agent, or Firm* — McCoy Russell LLP

(57) ABSTRACT

Various methods and systems are provided for an exhaust gas recirculation system. In one embodiment, an engine method comprises routing exhaust gas from a first cylinder group of an engine to an exhaust gas recirculation passage coupled to both an intake passage and an exhaust passage of the engine, the first cylinder group having a first amount of positive intake and exhaust valve overlap, and routing exhaust gas from a second cylinder group of the engine only to the exhaust passage of the engine, the second cylinder group having a second, smaller amount of positive intake and exhaust valve overlap.

18 Claims, 4 Drawing Sheets

(56) References Cited

U.S. PATENT DOCUMENTS

| | | | |
|---|---|---|---|
| 2009/0308070 A1* | 12/2009 | Alger, II | F02D 13/0238 |
| | | | 60/602 |
| 2010/0071659 A1 | 3/2010 | Moriya et al. | |
| 2011/0100327 A1 | 5/2011 | Nakagawa et al. | |
| 2011/0153181 A1* | 6/2011 | Bagnasco | F01L 13/00 |
| | | | 701/109 |
| 2012/0078492 A1* | 3/2012 | Freund | F02D 41/0065 |
| | | | 701/108 |
| 2012/0204845 A1* | 8/2012 | Gingrich | F02M 25/0707 |
| | | | 123/568.17 |

FOREIGN PATENT DOCUMENTS

| | | |
|---|---|---|
| GB | 2066355 A | 7/1981 |
| JP | 2001303936 A | 10/2001 |
| JP | 2006009656 A | 1/2006 |

OTHER PUBLICATIONS

Unofficial English translation of Office Action issued in connection with corresponding CN Application No. 201380037456.9 dated May 24, 2016.

Unofficial English Translation of office action issued for CN Patent Application No. 201380037456.9, dated Mar. 17, 2017.

* cited by examiner

METHOD AND SYSTEM FOR MATCHING AIR FLOW IN AN EXHAUST GAS RECIRCULATION SYSTEM

FIELD

Embodiments of the subject matter disclosed herein relate to an engine, engine components, and an engine system, for example.

BACKGROUND

Engine valve event timing, such as the opening and closing of the exhaust valves, may be optimized to provide desired cylinder air flow, residual exhaust fraction, and other parameters. The timing of the valve events may be similar for all cylinders, even if the cylinders experience differential exhaust backpressure or additional factors that may impact cylinder air flow. Thus, while the valve timing may be optimal for some cylinders, other cylinders may suffer from inefficient air flow, contributing to degraded fuel economy and/or emissions.

BRIEF DESCRIPTION

In one embodiment, an engine method comprises routing exhaust gas from a first cylinder group of an engine to an exhaust gas recirculation passage coupled to both an intake passage and an exhaust passage of the engine, the first cylinder group having a first amount of positive intake and exhaust valve overlap, and routing exhaust gas from a second cylinder group of the engine only to the exhaust passage of the engine, the second cylinder group having a second, smaller amount of positive intake and exhaust valve overlap.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an exhaust gas recirculation system in an engine. In particular, in one embodiment, the exhaust gas recirculation system includes a first cylinder group configured to route exhaust to an intake of the engine and/or to atmosphere. The first cylinder group includes a first camshaft to open and close the exhaust valves of the first cylinder group such that the exhaust valves are open for a first duration. A second cylinder group is configured to route exhaust only to atmosphere. The second cylinder group includes a second camshaft configured to open the exhaust valves of the second cylinder group for a second duration, shorter than the first duration, by closing the exhaust valves of the second cylinder group earlier than the closing of the exhaust valves of the first cylinder group. In one example, the duration may refer to a number of crankshaft angular degrees of rotation for which the exhaust valve is open.

By opening the exhaust valves of the first cylinder group for a different duration than the second cylinder group, air flow between the between the cylinder groups may be better balanced and maintained within a tighter tolerance of one another, despite differences in cylinder conditions, such as due to difference in exhaust pressures. For example, the first cylinder group, because it may route exhaust back to the intake rather than atmosphere, may experience an increased amount of exhaust backpressure and other factors that impact air flow into the cylinders, compared to the second cylinder group which only routes exhaust to the atmosphere. By differentially controlling the exhaust valve events between the two cylinder groups, equal air flow to both cylinder groups may be maintained.

While the above example illustrates different opening durations of the exhaust valves between the cylinder groups, or cylinder banks, other differences in valve timing, lift, etc. may be used in addition, or in place of, differences in the opening durations. For example, exhaust valve opening timings, exhaust valve closing timings, exhaust valve lift amounts, and other parameters may be different between the cylinder groups.

Figure 1:
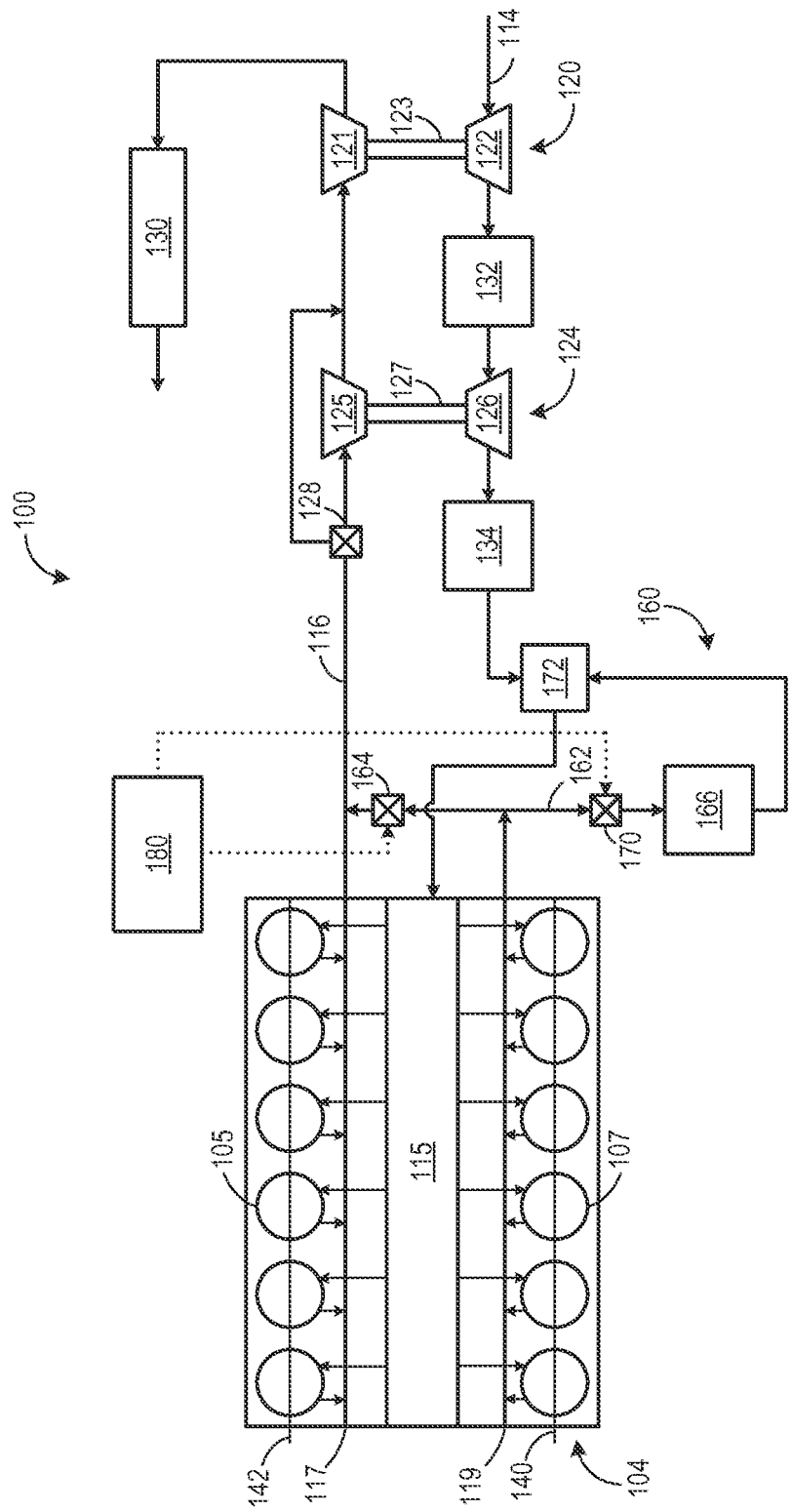
FIG. 1 shows a schematic diagram of an example embodiment of an engine with a plurality of donor cylinders and a plurality of non-donor cylinders according to an embodiment of the invention.

FIG. 1 shows a block diagram of an exemplary embodiment of an engine system 100 with an engine 104, such as an internal combustion engine. The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116.

In the example embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Thus, the engine includes a first, donor cylinder group configured to route exhaust to the intake and/or atmosphere, and a second, non-donor cylinder group configured to route exhaust only to atmosphere. The non-donor cylinder exhaust manifold 117 and donor cylinder exhaust manifold 119 are maintained separately from each other. Other than the crossover passage controlled by valve 164, the manifolds do not include common passageways enabling communication between the non-donor cylinder manifold and the donor cylinder manifold. However, both the first, donor cylinder group and second, non-donor cylinder group receive the same intake air via the intake manifold 115, and are subject to equal intake manifold pressure.

In the example embodiment shown in FIG. 1, when a second valve 170 is open, exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Further, the EGR system 160 includes a first valve 164 disposed between the exhaust passage 116 and the EGR passage 162. The second valve 170 may be an on/off valve controlled by the control unit 180 (for turning the flow of EGR on or off), or it may control a variable amount of EGR, for example. In some examples, the first valve 164 may be actuated such that an EGR amount is reduced (exhaust gas flows from the EGR passage 162 to the exhaust passage 116). In other examples, the first valve 164 may be actuated such that the EGR amount is increased (e.g., exhaust gas flows from the exhaust passage 116 to the EGR passage 162). In some embodiments, the EGR system 160 may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an exhaust valve, while the second valve 170 may be referred to as an EGR valve. In the example embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

As shown in FIG. 1, the engine system 100 further includes an EGR mixer 172 which mixes the recirculated exhaust gas with charge air such that the exhaust gas may be evenly distributed within the charge air and exhaust gas mixture. In the example embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the engine system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

Figure 3:
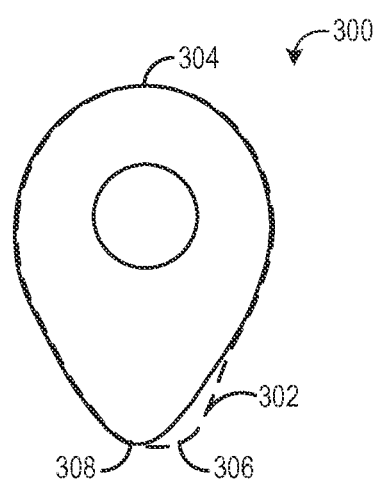
FIG. 3 shows a schematic diagram of example cam lobe profiles according to an embodiment of the invention.

Engine system 100 may include one or more camshafts to control intake and/or exhaust valve events. As shown in FIG. 1, a first camshaft 140 controls exhaust valve events for the donor cylinder group and a second camshaft 142 controls exhaust valve events for the non-donor cylinder group. The first camshaft 140 may include cam lobes having a first profile to close the exhaust valves of the donor cylinder group at a first timing. The second camshaft 142 may include cam lobes having a second profile to close the exhaust valves of the non-donor cylinder group at a second timing. The second timing may be earlier than the first timing. Example cam lobe profiles for cams lobes of the first and second camshafts are depicted in FIG. 3.

In some embodiments, the first camshaft 140 may be configured to open the exhaust valves of the donor cylinder group for a first duration, while the second camshaft 142 may be configured to open the exhaust valves of the non-donor cylinder group for a second duration, different than the first duration. Engine system 100 may include additional camshafts to control intake valve events, or first and second camshafts 140, 142 may control both intake and exhaust valve events. Additional information regarding controlling exhaust valve events will be presented below with respect to FIGS. 2-5.

As depicted in FIG. 1, the engine system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The second turbocharger 124 operates at a relatively higher pressure, and includes a second turbine 125 which drives a second compressor 126. The second turbine and the second compressor are mechanically coupled via a second shaft 127. In the example embodiment shown in FIG. 1, the second turbocharger 124 is provided with a wastegate 128 which allows exhaust gas to bypass the second turbocharger 124. The wastegate 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. In other embodiments, each of the turbochargers 120 and 124 may be provided with a wastegate, or only the second turbocharger 124 may be provided with a wastegate.

The engine system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The engine system 100 further includes the control unit 180, which is provided and configured to control various components related to the engine system 100. In one example, the control unit 180 includes a computer control system. The control unit 180 further includes non-transitory, computer readable storage media including code for enabling on-board monitoring and control of engine operation. The control unit 180, while overseeing control and management of the engine system 100, may be configured to receive signals from a variety of engine sensors, as further elaborated herein, in order to determine operating parameters and operating conditions, and correspondingly adjust various engine actuators to control operation of the engine system 100. For example, the control unit 180 may receive signals from various engine sensors including, but not limited to, engine speed, engine load, boost pressure, ambient pressure, exhaust temperature, exhaust pressure, etc. Correspondingly, the control unit 180 may control the engine system 100 by sending commands to various components such as traction motors, alternator, cylinder valves, throttle, heat exchangers, wastegates or other valves or flow control elements, etc.

Figure 2:
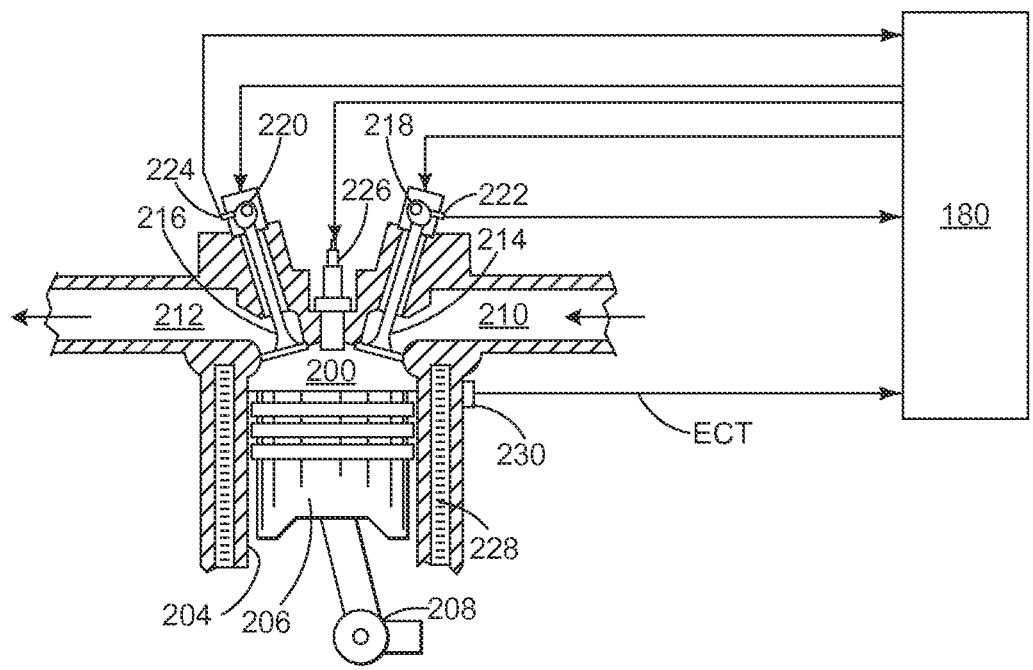
FIG. 2 shows a schematic diagram of one cylinder of an engine according to an embodiment of the invention.

FIG. 2 depicts an example embodiment of a combustion chamber, or cylinder 200, of a multi-cylinder internal combustion engine, such as the engine 104 described above with reference to FIG. 1. The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208. Cylinder 200 may include a cooling sleeve 228 which may include a temperature sensor 230 configured to output an engine coolant temperature (ECT) signal to control unit 180.

The cylinder 200 receives intake air for combustion from an intake passage 210. The intake passage 210 receives ambient air from an air filter (not shown) that filters air from outside of a vehicle in which the engine is positioned. The intake passage 210 may communicate with other cylinders of the engine in addition to the cylinder 200, for example.

Exhaust gas resulting from combustion in the engine is supplied to an exhaust passage 212. Exhaust gas flows through the exhaust passage 212, to a turbocharger (not shown in FIG. 2) and to atmosphere. The exhaust passage 212 may further receive exhaust gases from other cylinders of the engine in addition to the cylinder 200, for example.

In some embodiments, as described with reference to FIG. 1, the vehicle system may include more than one exhaust passage. For example, a donor group of cylinders may be coupled to a first exhaust manifold and a non-donor group of cylinders may be coupled to a second exhaust manifold that is separated from the first exhaust manifold. In this way, one of the groups of cylinders may be comprised exclusively of donor cylinders which recirculate exhaust gas to the intake passage 210 under selected operating conditions.

Continuing with FIG. 2, each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

In some embodiments, the intake valve 214 may be controlled by the control unit 180 via an actuator 218. Similarly, the exhaust valve 216 may be controlled by the control unit 180 via an actuator 220. During some conditions, the control unit 180 may vary the signals provided to the actuators 218 and 220 to control the opening and closing of the respective intake and exhaust valves relative to crankshaft timing. The position of the intake valve 214 and the exhaust valve 216 may be determined by respective valve position sensors 222 and 224, respectively. The valve actuators may be of the electric valve actuation type or cam actuation type, or a combination thereof, for example. In other embodiments, the intake valve 214 and exhaust valve 216 may be controlled via a fixed camshaft timing system relative to crankshaft timing rather than via the control unit 180.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

Turning to FIG. 3, a diagram 300 depicting example cam lobes is shown. A first cam lobe 302 having a first cam profile is depicted with a dashed line and superimposed over a second cam lobe 304 having a second cam profile, where the cams in this end view are positioned at the same crank angle timing. The first cam lobe 302 may be included on first camshaft 140 in order to control the exhaust valve events of the first, donor cylinder group. The second cam lobe 304 may be included on second camshaft 142 in order to control the exhaust valve events of the second, non-donor cylinder group. As shown in FIG. 3, the first cam lobe has a wider tip end 306 as compared to the tip end 308 of the second cam lobe 304. This results in the exhaust valve for which cam lobe 302 controls to be open for a longer duration and close later than the exhaust valve for which cam lobe 304 controls. Both cam lobes 302 and 304 are configured to open exhaust valves at the same time. However, in some embodiments, cam lobe 302 may have an end tip with a width substantially equal to the width of the tip end of cam lobe 304, and may be rotated at an angle with respect to cam lobe 304 in order to open and close its exhaust valve later than cam lobe 304 relative to crank angle and thus piston position relative to top-dead-center and/or bottom-dead-center.

The engine system as illustrated in FIGS. 1 and 2 may be configured for improved air flow into both the donor and non-donor cylinders. The exhaust valve timing for the donor cylinders may be different than the exhaust valve timing of the non-donor cylinders in order to provide improved air flow to the donor cylinders. The exhaust valves of the donor cylinders may be closed later than the exhaust valves of the non-donor cylinders and hence provide an increased amount of positive valve overlap between the intake and exhaust valves of the donor cylinder group as compared to the non-donor cylinders. The delayed exhaust valve closing of the donor cylinders may be provided by a fixed camshaft that is structured different than the camshaft controlling the valve events of the non-donor cylinders, such as shown in FIG. 3. However, in other embodiments, the delayed exhaust valve closing may be provided by a variable camshaft timing system that is controlled by the control unit 180 to adjust the timing of the exhaust valve closing based on operating conditions.

Thus, in some embodiments an engine system includes a first cylinder group coupled exclusively to an exhaust gas recirculation passage configured to route exhaust to an intake passage and an exhaust passage of the engine, a second cylinder group coupled exclusively to the exhaust passage of the engine, a first camshaft having cam lobes with a first profile to close exhaust valves of the first cylinder group at a first timing, and a second camshaft having cam lobes with a second profile to close exhaust valves of the second group at a second timing, the second timing earlier than the first timing.

In another embodiment, a system comprises means for routing exhaust gas from a first cylinder group of an engine to an exhaust gas recirculation passage coupled to both an intake passage and an exhaust passage of the engine, the first cylinder group having a first amount of positive intake and exhaust valve overlap, and means for routing exhaust gas from a second cylinder group of the engine only to the exhaust passage of the engine, the second cylinder group having a second, smaller amount of positive intake and exhaust valve overlap.

In one example, the means for routing exhaust gas from a first cylinder group to an exhaust recirculation passage coupled to both an intake passage and exhaust passage comprises a first exhaust manifold, such as exhaust manifold 119, coupled to an EGR passage, such as passage 162. Thus, when the exhaust valves of the first cylinder group open, the exhaust is expelled to exhaust manifold 119 and then to EGR passage 162. Based on the positions of first valve 164 and second valve 170, the exhaust may be routed to the intake and/or to atmosphere. Other configurations are also possible for the means for routing exhaust from the first cylinder group to an exhaust recirculation passage coupled to both an intake passage and an exhaust passage. For example, the means may comprise multiple exhaust manifolds, each coupled to a common EGR passage or to separate EGR passages. In another example, each cylinder may include separate cylinder exhaust passages rather than a manifold, and each cylinder exhaust passage may be coupled to the EGR passage.

In a further example, the means for routing exhaust gas from the second cylinder group of the engine only to the exhaust passage of the engine comprises a second exhaust manifold, such as manifold 117, coupled to an exhaust passage, such as passage 116. When the exhaust valves of the second cylinder group open, the exhaust is expelled to the second exhaust manifold, through the exhaust passage to the atmosphere. Similar to the means described above, other configurations are possible, such as multiple exhaust manifolds, or separate exhaust passages rather than a manifold.

Figure 4:
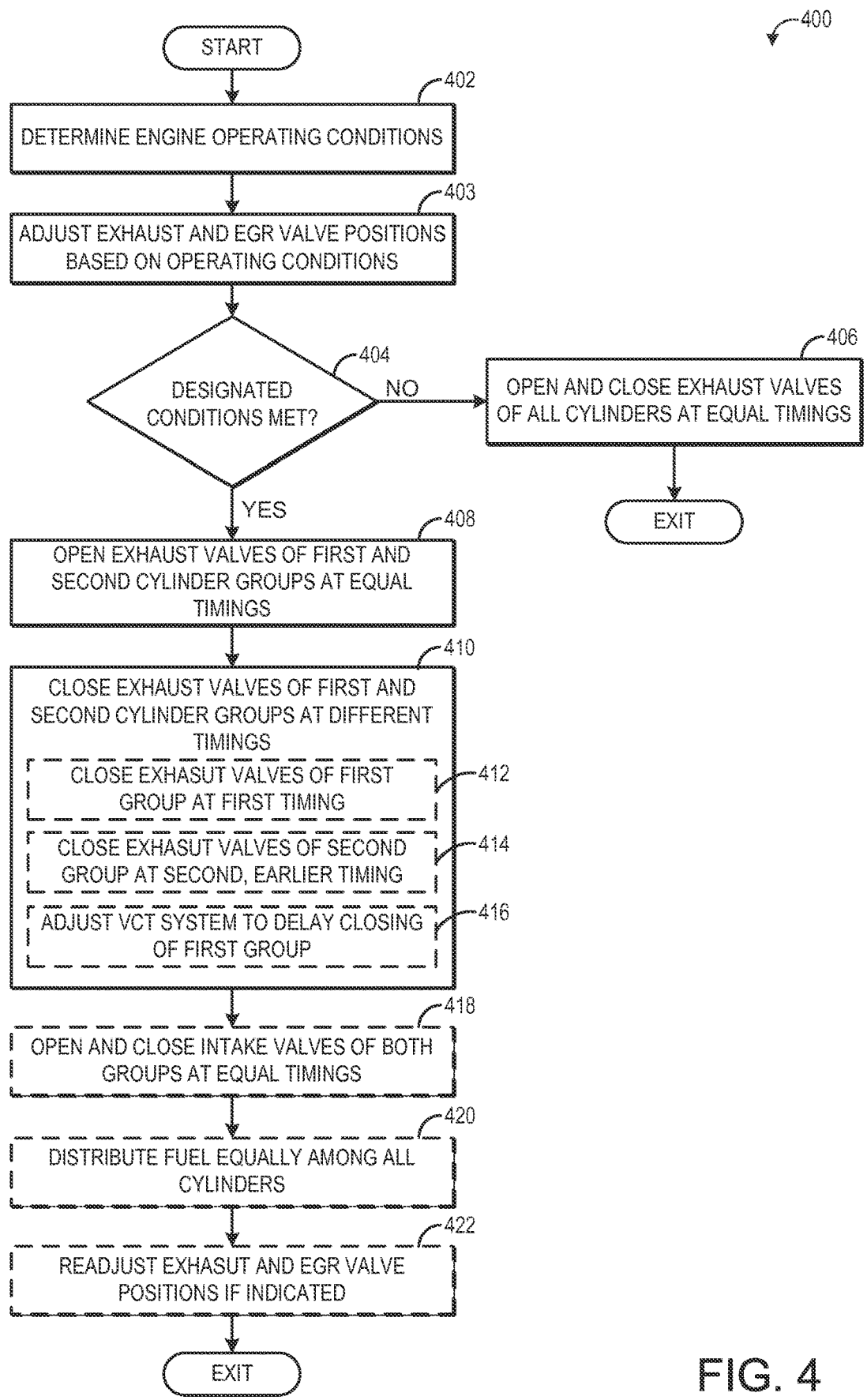
FIG. 4 is a flow chart illustrating a method for matching air flow between a plurality of donor cylinders and a plurality of non-donor cylinders according to an embodiment of the invention.

Turning to FIG. 4, a flow chart illustrating a method 400 for matching air flow rates between cylinder groups is depicted. Method 400 may be carried out by control unit 180 according to instructions stored thereon. Method 400 may provide for differential exhaust valve timing between a first cylinder group, configured to route exhaust back to the intake, and a second cylinder group, configured to route exhaust only to atmosphere. The differential exhaust valve timing may be activated in response to designated operating conditions. The designated operating conditions may be indicative of EGR being routed from the first cylinder group to the intake of the engine. By activating differential exhaust valve timing in response to EGR, air flow through both the first and second cylinder groups may be optimized to provide enhanced performance and allow for equal fuel distribution among the cylinders.

Method 400 comprises, at 402, determining engine operating parameters. The engine operating parameters may include engine speed and load, engine temperature, EGR valve position (such as the position of valve 170), the amount of exhaust being routed to the intake, and other parameters. Based on the operating parameters, at 403, one or more of the exhaust valve (e.g., valve 164) and EGR valve (e.g., valve 170) may be adjusted to deliver a desired amount of EGR to the cylinders. For example, during low engine speed and load or cold engine temperature conditions, no EGR may be routed to the cylinders, and as such the EGR valve may be closed and the exhaust valve may be opened. During higher speed and load conditions, the EGR valve may be opened to deliver exhaust from the first, donor cylinder group to the engine. Based on the desired amount of EGR, which may be a function of engine speed and load, the exhaust valve may be opened or closed. Further, if the EGR valve and exhaust valve include more than two positions, the EGR and/or exhaust valve may be set to a partially open position to deliver a desired amount of EGR to the engine. The exhaust from the first cylinder group that is not routed to the engine is routed to the exhaust passage and eventually to atmosphere.

At 404 it is determined if designated conditions have been met. In some embodiments, the designated conditions may include the EGR valve being in an open position. In other embodiments, the designated conditions may include an amount of exhaust recirculated to the intake exceeding a threshold, such as an EGR rate of 5%. In still further embodiments, the designated conditions may include engine speed and load exceeding respective thresholds. For example, the designated conditions may include mid to high engine speed and load.

If the designated conditions have not been met, method 400 proceeds to 406 to open and close the exhaust valves of the first and second cylinder groups at equal timings. Because conditions indicating EGR flow to the intake are not met, both cylinder groups may be experiencing similar cylinder air flow conditions. Hence, the intake and exhaust valves may be opened and closed equally between the first and second cylinder groups. If the designated conditions have been met, method 400 proceeds to 408 to open the exhaust valves of the first and second cylinder groups at equal timings.

At 410, method 400 includes closing the exhaust valves of the first and second cylinder groups at different timings. As explained previously, by opening the exhaust valves of the first cylinder group for a different duration than the second cylinder group, air flow through the first cylinder group may be optimized to compensate for the additional exhaust backpressure and other factors caused by the routing of exhaust from the first cylinder group to the intake of the engine.

Closing the exhaust valves of the first and second cylinder groups at different timings may include closing the exhaust valves of the first cylinder group at a first timing at 412. At 414, closing the exhaust valves at different timings may also include closing the exhaust valves of the second cylinder group at a second, earlier timing. In this way, the exhaust valves of the first cylinder group, which donates exhaust for EGR, may be closed later the exhaust valves of the second cylinder group, which does not donate exhaust for EGR. The exhaust valves of the first cylinder group may be opened for a first duration and the exhaust valves of the second cylinder group may be opened for no more than a second, shorter duration between successive valve closings.

At 416, closing the exhaust valves at different timings may include adjusting a variable camshaft timing (VCT) system to delay the closing of the valves of the first cylinder group. Thus, by utilizing a VCT system, the valve timing of the first, donor cylinder group may be adjusted based on operating conditions in order to maintain optimal air flow through the cylinder group. However, in some embodiments, a fixed camshaft timing system may be used. In such circumstances, the valve events of the first cylinder group may not be adjusted based on operating conditions. Instead, regardless of whether EGR is routed to the intake from the first cylinder group or whether the exhaust from the first cylinder group is routed to the atmosphere, the exhaust valves of the first cylinder group may be closed later than the second cylinder group, during substantially all engine operating conditions. As used herein, substantially all engine operating conditions comprises all operating conditions where valve events are occurring.

At 418, method 400 optionally includes opening and closing the intake valves of the first and second cylinder groups at equal timings. Thus, only the exhaust valve events may be different between the first and second cylinder groups. In other embodiments, however, the intake valve timing of the first cylinder group may be adjusted similarly to the exhaust valve timing, such that the intake valves of the first cylinder group are closed later than the intake valves of the second cylinder group.

At 420, method 400 optionally includes distributing fuel equally among all cylinders. Because the air flow between the first and second cylinder groups is matched as a result of the delayed exhaust valve closing, equal fuel amounts may be injected to each cylinder in order to maintain the cylinders at relatively equal air-fuel ratios. However, in other embodiments, the fuel may be distributed differentially among the cylinders. For example, the first cylinder group may receive an increased amount of fuel compared to the second cylinder group. Alternatively or additionally, fuel injection parameters, including the amount of fuel injected to each cylinder as well as the injection timing, may be maintained upon the adjustment of the exhaust valve closing timing.

At 422, method 400 includes adjusting the exhaust valve and/or EGR valve if indicated. After delaying the closing time of the exhaust valves of the first cylinder group, the exhaust back pressure from the first cylinder group may be different than the pressure from the second cylinder group. For example, adjusting the valve closing time may result in decreased exhaust pressure from the first cylinder group relative to the second cylinder group. The exhaust and EGR valves may optionally be adjusted based on this pressure differential. For example, the exhaust valve may be closed as the exhaust pressure from the first cylinder group decreases, in order to increase the pressure of the exhaust traveling to the intake.

Thus, the method of FIG. 4 provides for an engine method comprising, during designated conditions, matching air flow rates through a first cylinder group to air flow rates through a second cylinder group, selectively routing exhaust from the first cylinder group to an exhaust passage and to an intake passage, and routing exhaust from the second cylinder group only to the exhaust passage. The air flow rates may be matched by closing exhaust valves of the first cylinder group at a first timing and closing exhaust valves of the second cylinder group at an earlier, second timing.

In another embodiment, a method includes opening exhaust valves of a first cylinder group for a first duration, opening exhaust valves of a second cylinder group for no more than a second, shorter duration between successive valve closings, selectively routing exhaust from a the first cylinder group to an exhaust passage via a first valve and to an intake passage via a second valve, and routing exhaust from the second cylinder group only to the exhaust passage.

Figure 5A:
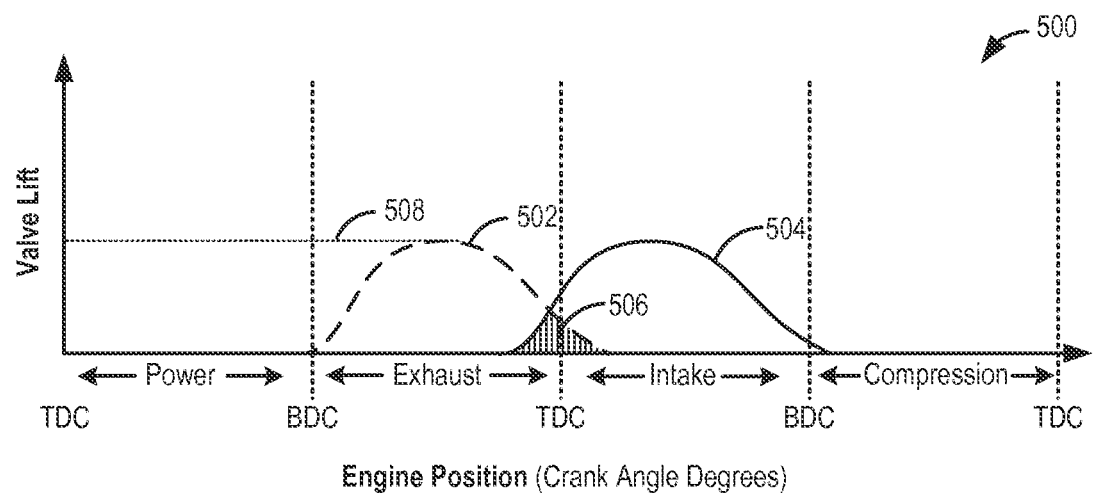
FIGS. 5A and 5B are diagrams depicting example intake and exhaust valve timings according to an embodiment of the invention.
Figure 5B:
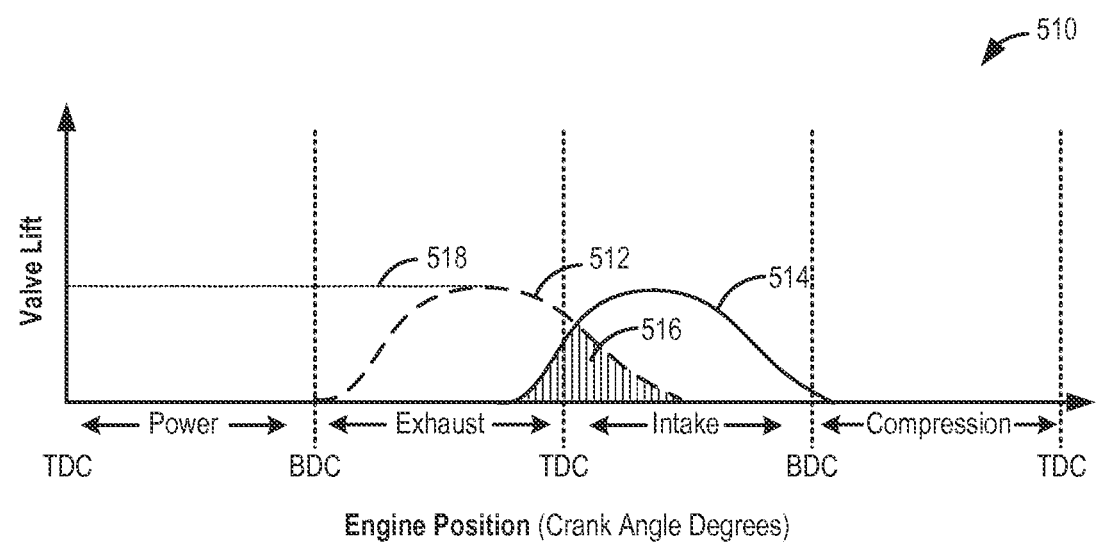

In this way, the exhaust valves of the first cylinder group may be closed at a timing later than the exhaust valve closing timing of the second cylinder group. FIGS. 5A and 5B are diagrams depicting example valve timing events for the first and second cylinder groups. FIG. 5A illustrates valve timing events for the second cylinder group in diagram 500 while FIG. 5B illustrates the valve timing events for the first cylinder group in diagram 510. Both diagram 500 and diagram 510 include engine position on the x axis and valve lift on the y axis. Referring to diagram 500 of FIG. 5A, curves 502 and 504 depict valve timings for an exhaust valve (dashed curve 502) and an intake valve (solid curve 504) of the second, non-EGR donating cylinder group during the same engine operation and at the same scale, although the different cylinders may be staggered with respect to engine position according to the firing order of the engine. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 506 (or simply, positive valve overlap), represented by a hatched region at the intersection of curves 502 and 504.

Referring to diagram 510 of FIG. 5B, curves 512 and 514 depict valve timings for an exhaust valve (dashed curve 512) and an intake valve (solid curve 514) of the first, EGR donating cylinder group during engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. However, in contrast the second cylinder group, the exhaust valve of the first cylinder group may be closed slightly later than the exhaust valve of the second cylinder group, resulting in a larger amount of positive valve overlap 516.

Furthermore, in some embodiments, the exhaust valve of the first cylinder group (curve 512) may open at the same time as the exhaust valve of the second cylinder group, as depicted in FIGS. 5A and 5B. However, in other embodiments the exhaust valve of the first cylinder group may open later than the exhaust valve of the second cylinder group. Additionally, the maximum valve lift attained by the exhaust valve of the second cylinder group, shown by dashed line 508, may be equal to the maximum valve lift attained by the exhaust valve of first cylinder group (dashed line 518). In other embodiments, the maximum valve lift of the exhaust valve of the first cylinder group may be different than the exhaust valve of the second cylinder group. For example, if the exhaust valve of the first cylinder group is open for a longer duration than the exhaust valve of the second cylinder group, it may have a lower maximum valve lift.

While the above-described system and method match air flow rates between the donor and non-donor cylinder groups by utilizing differential exhaust valve timing, other mechanisms for matching air flow rates are possible. For example, the donor and non-donor cylinder groups may have different compression ratios. The compression ratio of a given cylinder may be a function of cylinder bore diameter, cylinder volume, and piston stoke, and thus the donor cylinders may include different cylinder bore diameter, volume, and/or piston stroke relative to the non-donor cylinders. Additionally or alternatively, the effective compression ratio of a cylinder may be reduced by delaying closing of the cylinder's intake valve, and thus the donor cylinder group may be configured to have a different intake valve closing timing relative to the non-donor cylinder group.

In some embodiments, the donor cylinder group may be configured to have a decreased compression ratio relative to the non-donor cylinder group. By decreasing the compression ratio of the donor cylinders, a smaller amount of charge air may be provided to the donor cylinders, thus matching the air flow rates to the non-donor cylinders. In other embodiments, the donor cylinder group may be configured to have an increased compression ratio relative to the non-donor cylinder group. By increasing the compression ratio, the donor cylinders may be able to better accommodate the cylinder exhaust fraction that may result from the increased exhaust back pressure provided by the routing of the exhaust to the intake.

Thus, in order to match air flow rates between the donor and non-donor cylinder groups, the exhaust valves of the donor cylinder group may be closed at a timing different than the exhaust valves of the non-donor cylinder, the donor cylinders may have a different amount of valve lift than the non-donor cylinders, or the donor cylinders may have a different compression ratio than the non-donor cylinders. Further, combinations of the above are also possible. For example, the donor cylinders may have a delayed exhaust valve closing timing and delayed intake valve closing timing relative to the non-donor cylinders. In another example, the donor cylinders may have a delayed exhaust valve closing timing, increased compression ratio, and a different amount of valve lift than the non-donor cylinders.

In one embodiment, an engine method includes routing exhaust gas from a first cylinder group of an engine to an exhaust gas recirculation passage coupled to both an intake passage and an exhaust passage of the engine, the first cylinder group having a first compression ratio. The method includes routing exhaust gas from a second cylinder group of the engine only to the exhaust passage of the engine, the second cylinder group having a second compression ratio, different than the first compression ratio. In one example, the compression ratio of the first cylinder group may be greater than the compression ratio of the second cylinder group. In another example, the compression ratio of the first cylinder group may be less than the compression ratio of the second cylinder group.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine method, comprising:
adjusting an exhaust gas recirculation (EGR) valve to selectively route exhaust gas from a first cylinder group of an engine to one or both of an intake passage and an exhaust passage of the engine via an exhaust gas recirculation passage, including during a first condition, adjusting the EGR valve to a first position to route all exhaust gas from the first cylinder group to the exhaust passage and during a second condition, adjusting the EGR valve to a second position to route at least some exhaust gas from the first cylinder group to the intake passage, and responsive to the EGR valve being in the second position, the first cylinder group has a first amount of positive intake and exhaust valve overlap and responsive to the EGR valve being in the first position, the first cylinder group has a second, smaller amount of positive intake and exhaust valve overlap; and
routing exhaust gas from a second cylinder group of the engine only to the exhaust passage of the engine, the second cylinder group having the second, smaller amount of positive intake and exhaust valve overlap, the exhaust gas recirculation passage configured to provide exhaust gas to both the first cylinder group and the second cylinder group.

2. The method of claim 1, wherein during the second condition, the first cylinder group has a delayed exhaust valve closing timing with respect to the second cylinder group.

3. The method of claim 1, wherein the first cylinder group and the second cylinder group have equal intake valve timing, wherein the EGR valve is a first EGR valve fluidically coupling the EGR passage to the intake passage, and further comprising a second EGR valve fluidically coupling the EGR passage to the exhaust passage, and during the first condition, the first EGR valve being in the first position includes the first EGR valve being fully closed and the second EGR valve is fully open and during the second condition, the first EGR valve being in the second position includes the first EGR valve being at least partly open.

4. The method of claim 1, wherein the first cylinder group has a delayed intake valve closing timing with respect to the second cylinder group at least during the second condition.

5. The method of claim 1, further comprising distributing fuel equally among all cylinders of the first and second cylinder groups during at least the second condition.

6. The method of claim 1, further comprising distributing a different amount of fuel to the first cylinder group than to the second cylinder group.

7. An engine method, comprising:
operating an engine by distributing fuel to a first cylinder group and to a second cylinder group;
responsive to an exhaust gas recirculation valve being in an open position where exhaust gas is routed from the first cylinder group to an exhaust passage and to an intake passage, increasing an amount of positive intake and exhaust valve overlap for the first cylinder group from a first amount to a second amount while maintaining the first amount of positive intake and exhaust valve overlap for the second cylinder group to match air flow rates through the first cylinder group to air flow rates through the second cylinder group; and
routing exhaust from the second cylinder group only to the exhaust passage.

8. The method of claim 7, wherein increasing the amount of positive intake and exhaust valve overlap for the first cylinder group from the first amount to the second amount while maintaining the first amount of positive intake and exhaust valve overlap for the second cylinder group comprises closing exhaust valves of the first cylinder group at a first timing and closing exhaust valves of the second cylinder group at an earlier, second timing to provide equal air flow rates through the first cylinder group and through the second cylinder group.

9. The method of claim 8, further comprising opening and closing intake valves of the first cylinder group at timings equal to opening and closing of intake valves of the second cylinder group.

10. The method of claim 8, further comprising,
if the exhaust gas recirculation valve is in the open position, adjusting a variable camshaft timing system to close the exhaust valves of the first cylinder group later than the exhaust valves of the second cylinder group; and
if the exhaust gas recirculation valve is in a closed position where exhaust gas from the first cylinder group is routed only to the exhaust passage, adjusting the variable camshaft timing system to close the exhaust valves of the first and second cylinder groups at equal timings.

11. The method of claim 7, wherein the increasing the amount of positive intake and exhaust valve overlap for the first cylinder group from the first amount to the second amount while maintaining the first amount of positive intake and exhaust valve overlap for the second cylinder group is further responsive to one or more of an amount of exhaust routed from the first cylinder group to the intake passage exceeding a threshold or engine speed and load above respective thresholds.

12. The method of claim 7, wherein the increasing the amount of positive intake and exhaust valve overlap for the first cylinder group from the first amount to the second amount while maintaining the first amount of positive intake and exhaust valve overlap for the second cylinder group is further responsive to an exhaust backpressure of the first cylinder group exceeding an exhaust backpressure of the second cylinder group.

13. The method of claim 7, wherein distributing fuel to the first cylinder group and the second cylinder group comprises distributing fuel equally among all cylinders in at least one mode of operation.

14. An engine method, comprising:
opening exhaust valves of a first cylinder group for a first duration;
opening exhaust valves of a second cylinder group for no more than a second, shorter duration between successive valve closings;
opening intake valves of the first cylinder group and opening intake valves of the second cylinder group for an equal duration;
selectively routing exhaust from the first cylinder group to an exhaust passage via a first valve and to an intake passage via a second valve;
routing exhaust from the second cylinder group only to the exhaust passage; and maintaining an equal air-fuel ratio among all cylinders of both the first and second cylinder groups.

15. The method of claim 14, wherein selectively routing exhaust from the first cylinder group to the intake passage and routing exhaust from the second cylinder group only to the exhaust passage increases exhaust backpressure of the first cylinder group relative to the second cylinder group, and wherein the exhaust valves of the first cylinder group are opened for the first duration and the exhaust valves of the second cylinder group are opened for no more than the second duration in order to match airflow rates through the first cylinder group and the second cylinder group.

16. The method of claim 14, wherein opening exhaust valves of the second cylinder group for the second, shorter duration further comprises closing the exhaust valves of the second cylinder group earlier than the exhaust valves of the first cylinder group.

17. A system, comprising:
means for routing exhaust gas from a first cylinder group of an engine to an exhaust gas recirculation passage coupled to both an intake passage and an exhaust passage of the engine, the first cylinder group having a first amount of positive intake and exhaust valve overlap responsive to an exhaust backpressure of the first cylinder group exceeding an exhaust backpressure of a second cylinder group of the engine, the first cylinder group having a second, smaller amount of positive intake and exhaust valve overlap responsive to the exhaust backpressure of the first cylinder group being equal to the exhaust backpressure of the second cylinder group; and
means for routing exhaust gas from the second cylinder group of the engine only to the exhaust passage of the engine, the second cylinder group having the second, smaller amount of positive intake and exhaust valve overlap, the exhaust gas recirculation passage configured to provide exhaust gas to both the first cylinder group and the second cylinder group.

18. An engine method, comprising:
during a first condition that includes an exhaust backpressure of a first cylinder group of an engine exceeding an exhaust backpressure of a second cylinder group of the engine, routing exhaust gas from the first cylinder group to an exhaust gas recirculation passage coupled to both an intake passage and an exhaust passage of the engine, the first cylinder group having a first compression ratio during the first condition;
during both the first condition and a second condition that includes the exhaust backpressure of the first cylinder group being equal to the exhaust backpressure of the second cylinder group, routing exhaust gas from the second cylinder group of the engine only to the exhaust passage of the engine, the second cylinder group having a second compression ratio, different than the first compression ratio; and
during the second condition, routing exhaust gas from the first cylinder group of the engine only to the exhaust passage of the engine, the first cylinder group having the second compression ratio during the second condition.

* * * * *